(12) United States Patent
Livingood

(10) Patent No.: US 12,081,589 B2
(45) Date of Patent: Sep. 3, 2024

(54) SYSTEMS AND METHODS FOR IMPROVED DOMAIN NAME SYSTEM SECURITY

(71) Applicant: Comcast Cable Communications, LLC, Philadelphia, PA (US)

(72) Inventor: Jason Livingood, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 276 days.

(21) Appl. No.: 17/156,168

(22) Filed: Jan. 22, 2021

(65) Prior Publication Data

US 2022/0239693 A1 Jul. 28, 2022

(51) Int. Cl.
| | | |
|---|---|---|
| *H04L 9/40* | (2022.01) | |
| *G06F 18/214* | (2023.01) | |
| *G06N 20/00* | (2019.01) | |
| *H04L 61/4511* | (2022.01) | |

(52) U.S. Cl.
CPC ........ *H04L 63/1483* (2013.01); *G06F 18/214* (2023.01); *G06N 20/00* (2019.01); *H04L 61/4511* (2022.05); *H04L 63/1416* (2013.01); *H04L 63/1425* (2013.01); *H04L 63/1433* (2013.01)

(58) Field of Classification Search
CPC ............. H04L 63/1483; H04L 61/4511; H04L 63/1416; H04L 63/1425; H04L 63/1433; G06F 18/214; G06N 20/00
USPC ......................................................... 726/22
See application file for complete search history.

(56) References Cited

U.S. PATENT DOCUMENTS

| | | | | |
|---|---|---|---|---|
| 8,321,551 | B2* | 11/2012 | Gardner | H04L 63/1425 709/224 |
| 9,686,291 | B2* | 6/2017 | Antonakakis | H04L 63/1425 |
| 9,749,336 | B1* | 8/2017 | Zhang | H04L 63/14 |
| 2007/0118669 | A1* | 5/2007 | Rand | H04L 63/20 709/245 |
| 2007/0204341 | A1* | 8/2007 | Rand | H04L 51/212 726/22 |
| 2010/0074125 | A1* | 3/2010 | Chandra | H04L 41/0846 370/252 |
| 2012/0297478 | A1* | 11/2012 | Martin | H04L 61/4511 726/22 |
| 2013/0291101 | A1* | 10/2013 | Karasaridis | G06F 21/00 726/22 |
| 2017/0272454 | A1* | 9/2017 | Seo | H04L 63/1425 |
| 2018/0063190 | A1* | 3/2018 | Wright | H04L 63/1425 |
| 2018/0219919 | A1* | 8/2018 | Crabtree | G06F 16/2477 |
| 2020/0228495 | A1* | 7/2020 | Ogale | H04L 41/0631 |
| 2021/0019674 | A1* | 1/2021 | Crabtree | G06V 30/274 |
| 2021/0288937 | A1* | 9/2021 | Vijayvargiya | H04L 63/1466 |

\* cited by examiner

*Primary Examiner* — Badri Narayanan Champakesan
(74) *Attorney, Agent, or Firm* — Ballard Spahr LLP

(57) ABSTRACT

Provided herein are methods and systems for improved domain name system (DNS) security. A computing device of a DNS, such as a recursive DNS server, may cache previously processed (e.g., resolved) DNS requests. The DNS cache may be a target for cache poisoning and other cache manipulation attacks. The methods and systems described herein may employ artificial intelligence, machine learning, and/or pattern recognition techniques to provide improved security for the DNS cache.

20 Claims, 10 Drawing Sheets

FIG. 2A ← 200

202 — www.example.com

204 ————————————————————
Record Name . . . . . . . . : www.example.com
Record Type. . . . . . . . : 5
Time To Live . . . . . . . : 6
Data Length . . . . . . . . : 8
Section . . . . . . . . . . : Answer
CNAME Record . . . . : star-mini.c10r.example.com ← 206

208 — Record Name . . . . . . : star-mini.c10r.example.com
Record Type . . . . . . . : 1
Time To Live . . . . . : 6
Data Length . . . . . . . : 4
Section . . . . . . . . . . : Answer
A (Host) Record . . . . : 31.13.65.36 ← 218

FIG. 2B ← 250

202 — www.example.com

204 ————————————————————
Record Name . . . . . . . . : www.example.com
Record Type. . . . . . . . : 5
Time To Live . . . . . . . : 6
Data Length . . . . . . . . : 8
Section . . . . . . . . . . : Answer
CNAME Record . . . . : star-mini.poisoned.example.com ← 203

205 — Record Name . . . . . . : star-mini.poisoned.example.com
Record Type . . . . . . . : 1
Time To Live . . . . . : 6
Data Length . . . . . . . : 4
Section . . . . . . . . . . : Answer
A (Host) Record . . . . : 66.66.66.66 ← 206

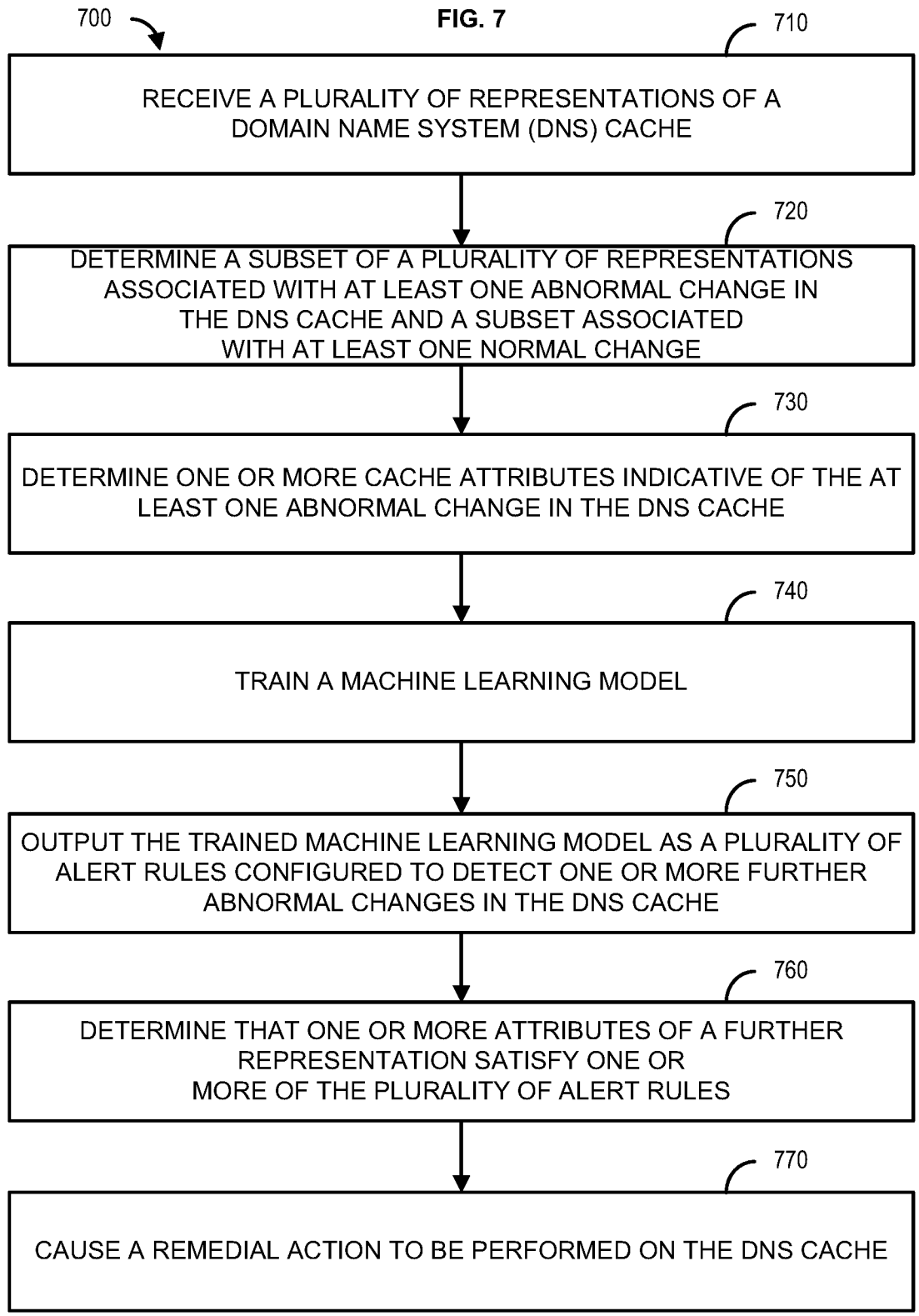

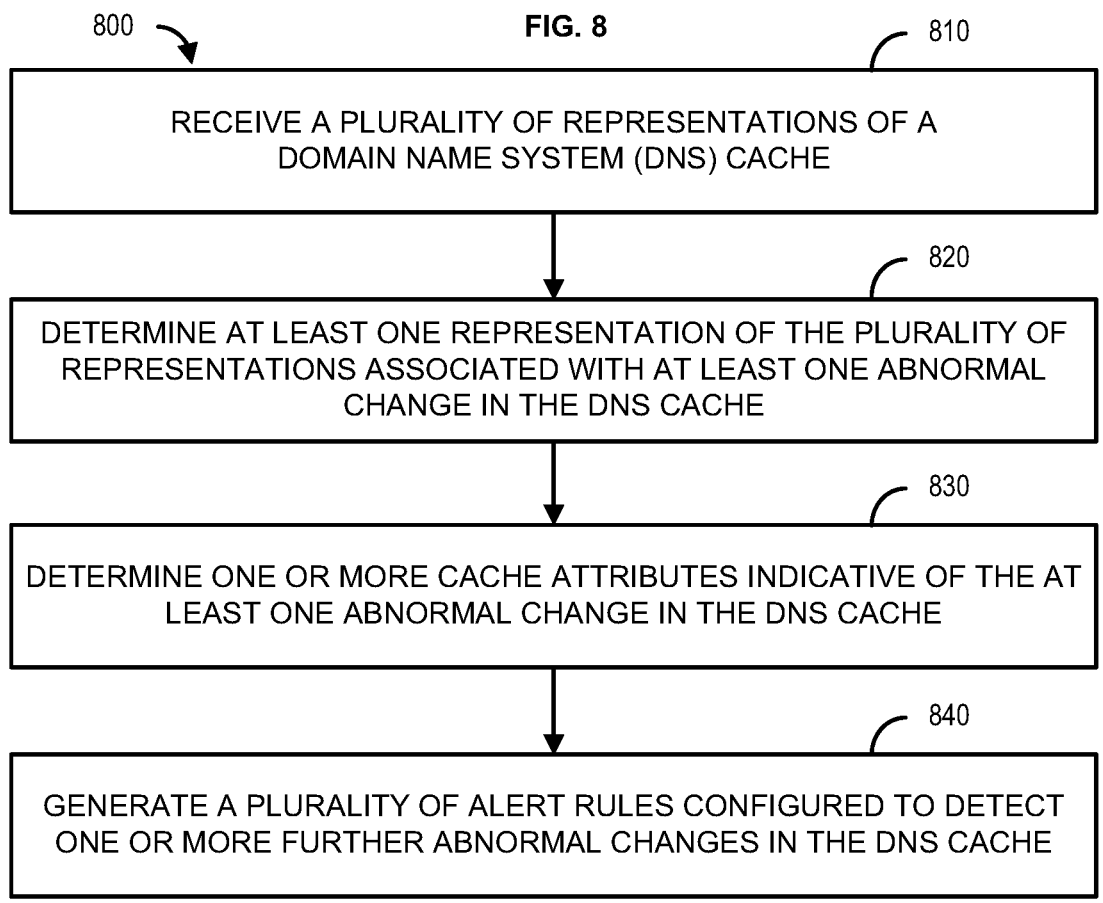

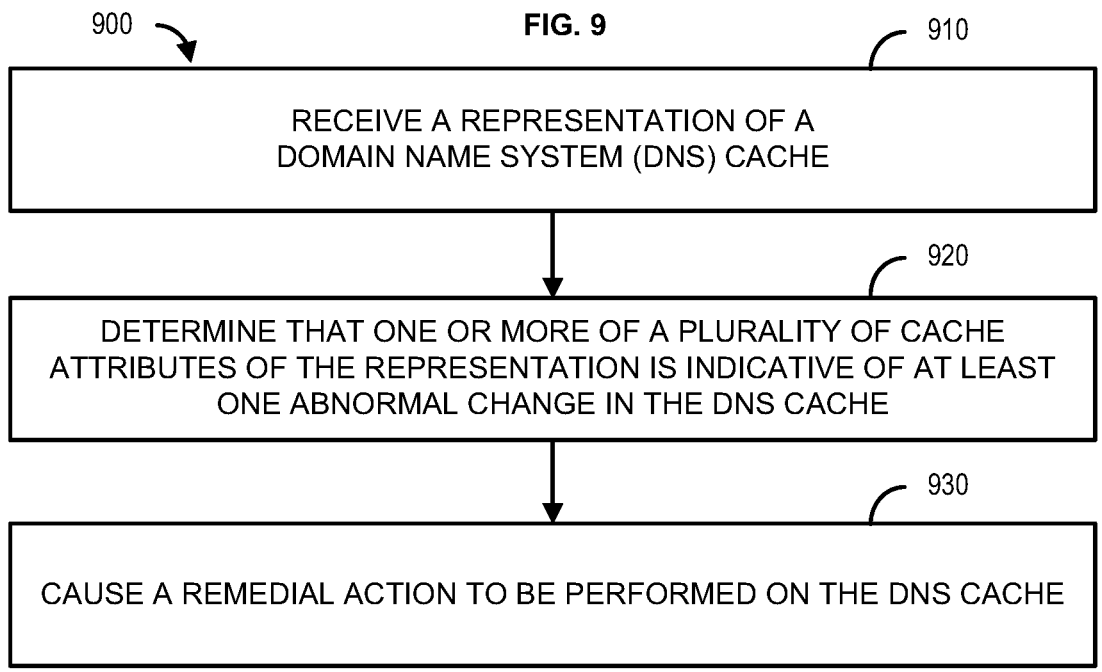

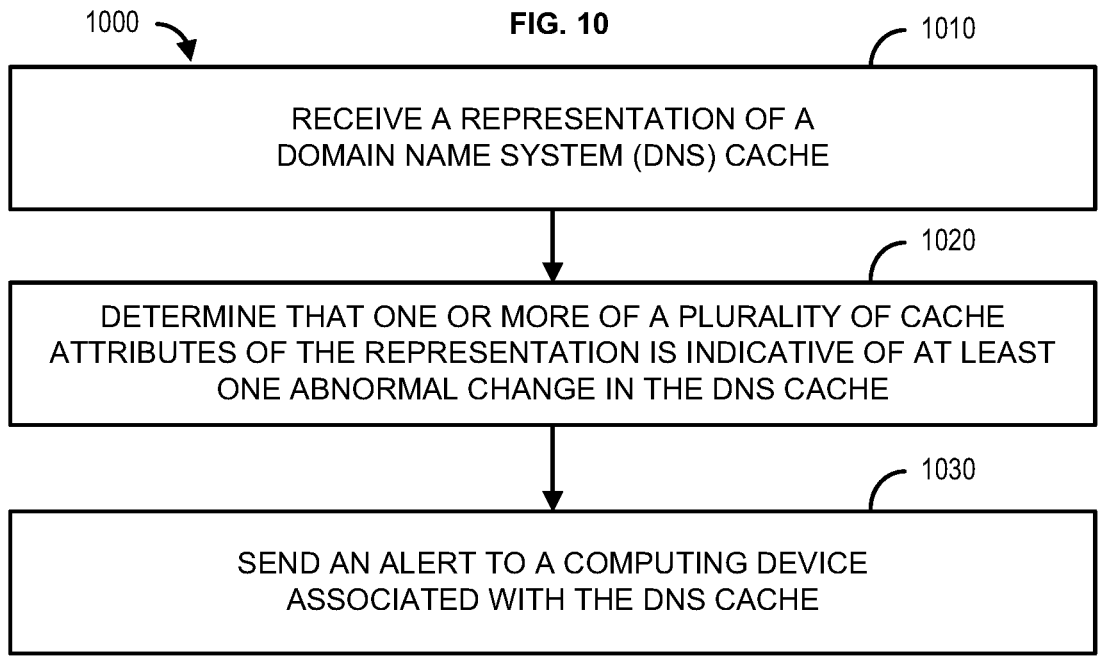

SYSTEMS AND METHODS FOR IMPROVED DOMAIN NAME SYSTEM SECURITY

BACKGROUND

When a computing device sends a request to visit a website, such as "www.example.com," the request is received by a Domain Name System (DNS) server that resolves the request and provides the computing device with an Internet protocol (IP) address for the server associated with "www.example.com." Such requests are routinely cached by the DNS at one or more servers that are part of the DNS. In this way, subsequent requests received for the same website/domain may be more quickly resolved by the DNS. These cached DNS records are sometimes a target for bad actors and hackers, who may attempt to "poison" the cached DNS records or add fraudulent DNS records to the cache in an effort to redirect legitimate website traffic to compromised servers under their control. Existing solutions to protect DNS cache records include the use of Domain Name System Security Extensions (DNSSEC), whereby authoritative name servers for a domain cryptographically "sign" DNS records associated with the domain. Unfortunately, very few of the most popular domains use DNSSEC, and there is no standards-based method to otherwise prevent DNS cache poisoning. These and other considerations are described herein.

SUMMARY

It is to be understood that both the following general description and the following detailed description are exemplary and explanatory only and are not restrictive. Provided herein are methods and systems for improved domain name system (DNS) security. A computing device of a DNS, such as a recursive DNS server, may cache previously processed (e.g., resolved) DNS requests. The DNS cache may be a target for cache poisoning and other cache manipulation attacks. The computing device of the DNS may receive a plurality of representations of the DNS cache. Each of the representations may comprise a plurality of cache attributes associated with the DNS cache at a unique time interval.

The computing device may use a first subset of the plurality of representations and a second subset of the plurality of representations to determine one or more cache attributes of the plurality of cache attributes that are indicative of at least one abnormal change in the DNS cache (e.g., a poisoning, a manipulation, an intrusion, etc.). The one or more cache attributes indicative of the at least one abnormal change in the DNS cache may be used by the computing device to train a machine learning model according to one or more techniques described herein. The trained machine learning model may be output by the computing device as a plurality of alert rules, which may be configured to detect one or more further abnormal changes in the DNS cache (e.g., a poisoning, a manipulation, an intrusion, etc.).

The computing device may receive a further representation of the DNS cache. The computing device may provide the further representation to the trained machine learning model to determine whether one or more attributes of the further representation satisfy one or more of the plurality of alert rules. The one or more of the plurality of alert rules may be satisfied when the one or more attributes of the further representation are determined to be indicative of a poisoning or a manipulation of the DNS cache. When the computing device determines that one or more of the plurality of alert rules are satisfied, the computing device may cause a remedial action to be performed on the DNS cache.

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIGS. 2A and 2B show example cache records;
FIG. 7 shows a flowchart for an example method;
FIG. 8 shows a flowchart for an example method;
FIG. 9 shows a flowchart for an example method;
and
FIG. 10 shows a flowchart for an example method.

DETAILED DESCRIPTION

Figure 1:
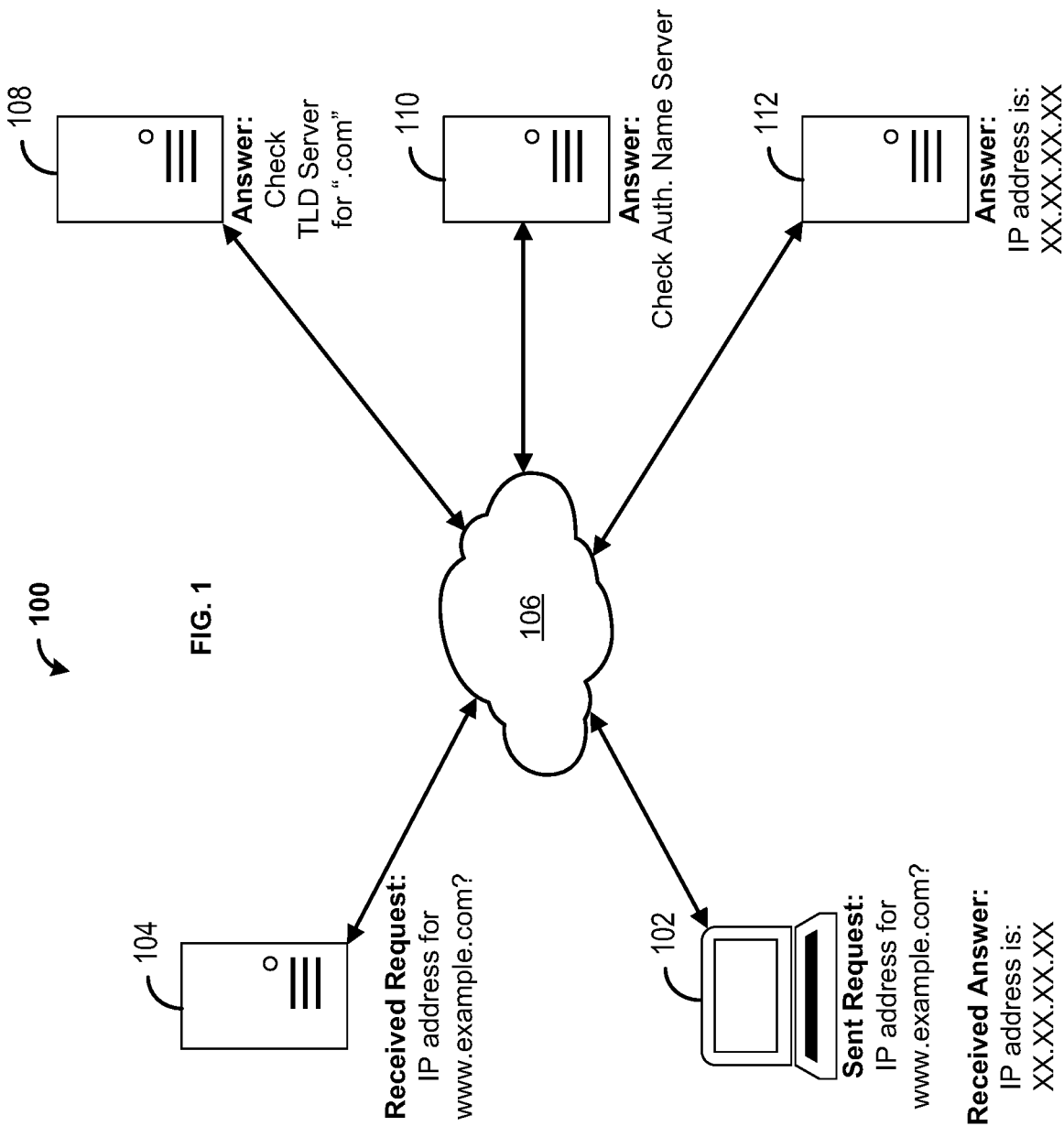
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for improved domain name system (DNS) security. A computing device of a DNS, such as a recursive DNS server and/or a DNS resolver, may cache previously processed (e.g., resolved) DNS requests. The DNS cache may be a target for cache poisoning and other cache manipulation attacks. The methods and systems described herein may employ artificial intelligence, machine learning, and/or pattern recognition techniques to provide improved security for the DNS cache. For example, the computing device of the DNS may receive a plurality of representations of the DNS cache. Each representation of the plurality of representations may be indicative of a state of the DNS cache at a particular time or time interval. For example, each representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like.

The plurality of representations may be associated with a single server of the DNS or multiple servers of the DNS. The plurality of representations may be associated with an entire DNS cache (e.g., for multiple domains/websites) or with less than the entire DNS cache. For example, the plurality of representations may capture a DNS cache on a cache-wide basis (e.g., for the entire DNS); at the top level basis (e.g., for a top-level DNS server); a domain-level basis (e.g., for a ".com" DNS server); at a sub-domain basis (e.g., for a sub-domain DNS server); at an authoritative domain basis (e.g., for an authoritative domain name server); and/or at a specific level basis (e.g., cache records for a specific domain).

Each representation of the plurality of representations may comprise a plurality of cache attributes associated with the DNS cache at a unique time interval, such a byte count of the DNS cache, the contents of the DNS record itself, a server name associated with a DNS resolution, a server location associated with a DNS resolution, or a visual representation of the DNS cache. The computing device may use the plurality of representations of the DNS cache to train a machine learning model. The computing device may select a first subset as well as a second subset of representations from the plurality of representations of the DNS cache for training the machine learning model. The first subset of representations may be associated with at least one abnormal change in the DNS cache (e.g., a poisoning, a manipulation, an intrusion, etc.), while the second subset of representations may be associated with at least one normal change in the DNS cache.

An example of a "normal" change in the DNS cache may include an increase or a decrease in a byte count of the DNS cache over a period of time that corresponds to traffic changes (e.g., the byte count of the DNS cache may be higher during periods of high traffic when more servers for a domain(s) are active, and vice-versa). Another example of a "normal" change in the DNS cache may include a server name and/or a server location associated with one or more DNS resolutions for a domain(s) that does not differ greatly from previous DNS resolutions for the domain(s) (e.g., historical records may show that the domain(s) may use servers with related names and/or locations). A further example of a "normal" change in the DNS cache may be in the DNS record itself, which may vary by time of day, day of week, location and/or network or part of the network on which an end user or DNS server is based, the location and/or network of a content server indicated in the DNS response, etc. A further example of a "normal" change in the DNS cache may include an expected change in a visual representation of the DNS cache for a domain(s). An expected change in a diagram of the DNS cache may show a level of interconnectedness between various servers for the domain. For example, the domain may usually use two content delivery networks each day and the domain may provide DNS records associated with those networks. The diagram of the DNS cache may show the two content delivery networks in communication with one another with respect to the domain. Accordingly, an "abnormal" change in the DNS cache may include the converse of any of the preceding examples of a "normal" change in the DNS cache. Such abnormal changes may be indicative of a poisoning or a manipulation of the DNS cache. What constitutes an "abnormal" change versus a "normal" change within the plurality of representations of the DNS cache may be determined by a network administrator or another computing device. For example, the network administrator or the other computing device may label the at least one abnormal change in the DNS cache and the at least one normal change in the DNS cache as such. In other words, the network administrator or the other computing device may determine a ground truth that the machine learning model may use as a basis for classifying further changes in the DNS cache as being "normal" or "abnormal."

The computing device may use the first subset and second subset of representations to determine one or more cache attributes indicative of the at least one abnormal change in the DNS cache. That is, the computing device may determine which cache attributes present within the plurality of representations are correlative with an abnormal change in the DNS cache (e.g., a poisoning, a manipulation, an intrusion, etc.). The one or more cache attributes indicative of the at least one abnormal change in the DNS cache may be used by the computing device to train the machine learning model according to one or more techniques described herein. The trained machine learning model may be output by the computing device as a plurality of alert rules, which may be configured to detect one or more further abnormal changes in the DNS cache (e.g., a poisoning, a manipulation, an intrusion, etc.). Each of the plurality of alert rules may be associated with one or more cache attributes and a level of confidence that the DNS cache has been poisoned or manipulated. In this way, certain cache attributes present within a representation may correspond to one or more particular alert rules that are associated with those cache attributes.

The computing device may receive a further representation of the DNS cache. The computing device may provide the further representation to the trained machine learning model to determine whether one or more attributes of the further representation are indicative of a poisoning or a manipulation of the DNS cache. The trained machine learning model may determine whether the one or more attributes of the further representation satisfy one or more of the plurality of alert rules. For example, the one or more of the plurality of alert rules may be satisfied when the trained machine learning model determines with a level of confidence above a threshold that the one or more attributes of the further representation are associated with one or more further abnormal changes to the DNS cache (e.g., a poisoning, a manipulation, an intrusion, etc.). In other words, satisfaction of one or more of the plurality of alert rules may indicate that the DNS cache has been poisoned or manipulated. The plurality of alert rules may be tailored to be more "aggressive" for certain domains (e.g., high-traffic/high-value domains). For example, the threshold may be set to a lower value for a certain domain such that a lower level of confidence may satisfy the threshold and the one or more of the plurality of alert rules.

When the computing device determines that one or more of the plurality of alert rules are satisfied, the computing device may cause a remedial action to be performed on the DNS cache. For example, the remedial action may comprise sending an alert to an administrator of the DNS cache. The alert may identify the one or more further abnormal changes to the DNS cache (e.g., a poisoning, a manipulation, an intrusion, etc.). As another example, the remedial action may comprise clearing (e.g., deleting) one or more records of the DNS cache (e.g., those suspected to be poisoned or manipulated).

Turning now to FIG. 1, an example system 100 is shown. The system 100 may be a Domain Name System (DNS), such as a recursive DNS. The system 100 may comprise a client device 102, a DNS resolver 104, a root server 108, a top-level domain (TLD) server 110, and an authoritative name server 112. Each of the devices of the system 100 may be in communication via a network 106, such as the Internet. The network 106 may facilitate communication between the client device 102, the DNS resolver 104, the root server 108, the TLD server 110, and the authoritative name server 112. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent any of the client device 102, the DNS resolver 104, the root server 108, the TLD server 110, and/or the authoritative name server 112 via a variety of transmission paths, including wireless paths (e.g., satellite paths, Wi-Fi paths, cellular paths, etc.) and terrestrial paths (e.g., wired paths, a direct feed source via a direct line, etc.).

The client device 102, such as a computing device, a user device, etc., may receive a command from a user to access a website, such as "www.example.com." The computing device 102 may send a request to the DNS resolver 104 to ascertain the Internet protocol (IP) address for a server that is associated with the website (the "website server"). The DNS resolver 104 may receive the request from the client device 104 and determine whether a DNS cache stored at the DNS resolver 104 (or any other device of the system 100) indicates the IP address for the website server. The DNS resolver 104 may determine that no record exits in the DNS cache for the website server, and the DNS resolver 104 may forward the request to the root server 108. The root server 108 may receive the request and determine whether a DNS cache stored at the root server 108 (or any other device of the system 100) indicates the IP address for the website server. The root server 108 may determine that no record exits in the DNS cache for the website server, and the root server 108 may instruct the DNS resolver 104 to query the TLD server 110 associated with ".com" websites. (e.g., based on the request including ".com"). The DNS resolver 104 may forward the request to the TLD server 110. The TLD server 110 may receive the request and determine whether a DNS cache stored at the TLD server 110 (or any other device of the system 100) indicates the IP address for the website server. The TLD server 110 may determine that no record exits in the DNS cache for the website server, and the TLD server 110 may instruct the DNS resolver 104 to query the authoritative name server 112. The DNS resolver 104 may forward the request to the authoritative name server 112. The authoritative name server 112 may receive the request and determine the IP address for the website server. The authoritative name server 112 may provide the IP address to the DNS resolver 104, which may in turn provide the IP address to the client device 102.

In order to avoid repeating the above process for each subsequent request for the IP address of the server associated with "www.example.com," the DNS resolver 104 (and/or another any other device of the system 100) may create a record to be stored in the DNS cache. The record may be associated with the IP address for the server associated with "www.example.com." In this way, subsequent requests for the IP address of the server associated with "www.example.com" may be more quickly processed by the system 100. An example of such a record of the DNS cache is shown in FIG. 2A as record 200.

As FIG. 2A shows, the record 200 of the DNS cache may be associated with a specific website address 202. The record 200 may include a first portion 204 and a second portion 208. The first portion 204 may be associated with alias name for the website (e.g., "www.example.com"). For example, the first portion 204 may be a CNAME DNS record that maps the alias name to a true domain name 206 for the website stored within the second portion 208 (e.g., "star-mini.c10r.example.com"). The second portion 208 may include an IP address for a server associated with the website (e.g., 31.13.65.36). As described herein, a DNS cache may be a target for cache poisoning and other cache manipulation attacks. For example, a bad actor may attempt to "poison" the record 200 or add fraudulent records to the DNS cache in an effort to redirect legitimate website traffic to compromised servers under their control.

FIG. 2B shows a record 250 of the DNS cache, which may correspond to the record 200 following a poisoning of the DNS cache or another cache manipulation attack. As shown in FIG. 2B, the record 250 may be associated with the specific website address 202 as previously indicated by the record 200. The record 250 may also include the first portion 204 of the record 200; however, the first portion 204 may have been poisoned/manipulated such that it now maps the alias name to an illegitimate domain name 203 for the website (e.g., "star-mini.poisoned.example.com"). A second portion 205 of the record 250 may include an IP address for an illegitimate server under the control of the bad actor that poisoned/manipulated the DNS cache (e.g., 66.66.66.66). Consequently, a subsequent request for the IP address of the server associated with "www.example.com" may cause the DNS resolver 104 (and/or another any other device of the system 100) to inadvertently direct the client device 102 to the illegitimate server.

To prevent or mitigate such poisoning/manipulation of the DNS cache, the system 100 may employ artificial intelligence, machine learning, and/or pattern recognition techniques to provide improved security for the DNS cache. For example, one or more of the DNS resolver 104, the root server 108, the TLD server 110, or the authoritative name server 112 may generate a plurality of representations of the DNS cache at one or more unique time intervals. The plurality of representations may be used along with one or more artificial intelligence, machine learning, or pattern recognition techniques as described herein to prevent or mitigate poisoning/manipulation of the DNS cache. Each representation of the plurality of representations may be indicative of a state of the DNS cache at a particular time or time interval. For example, each representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like.

Each representation of the plurality of representations may reflect a "snapshot" of the DNS cache at a particular time interval or period of time (e.g., all cache records existing as of May 5, 2020; 6:18 AM). The plurality of representations may be associated with the DNS cache of a single server of the system 100 or multiple servers of the system 100. The plurality of representations may be associated with an entire DNS cache (e.g., all domains/websites in the DNS cache) or with less than the entire DNS cache (e.g., one or more domains/websites). For example, the plurality of representations may capture all, or part(s) of, the DNS cache on a cache-wide basis (e.g., for the entire system 100); at the top level basis (e.g., for the root server 108); at a domain-level basis (e.g., for a ".com" portion of the DNS cache for the TLD server 110); at a sub-domain basis (e.g., for a sub-domain(s) portion of the DNS cache for the TLD server 110); at an authoritative domain basis (e.g., for the authoritative name server 112); and/or at a specific level basis (e.g., cache records for a specific domain(s)).

Each representation of the plurality of representations may comprise a plurality of cache attributes associated with the DNS cache at a unique time interval. For example, the plurality of cache attributes may comprise one or more of the elements shown in FIGS. 2A and 2B, such as data representing the first portion 204 and the second portion 208; an alias name for a website (e.g., "www.example.com"); the true domain name 206 for the website stored within the second portion 208 (e.g., "star-mini.c10r.example.com"); and/or the IP address for the server associated with the website (e.g., 31.13.65.36). As another example, the plurality of cache attributes may comprise one or more of a byte count of the DNS cache, a server name associated with a DNS resolution, a server location associated with a DNS resolution, or a visual representation of the DNS cache.

Figure 3:
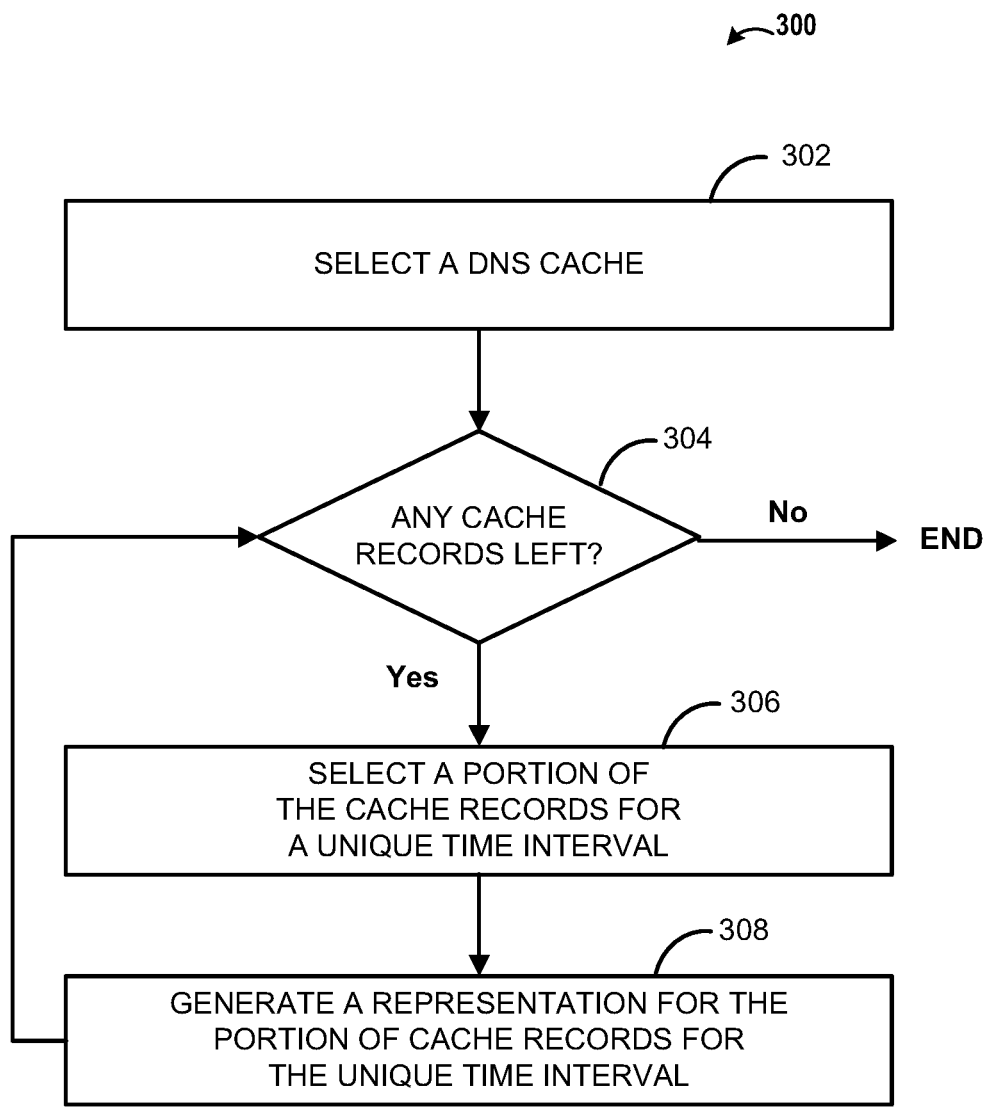
FIG. 3 shows an example process flowchart.

Turning now to FIG. 3, a flowchart for an example process 300 for generating the plurality of representations is shown. The process 300 may be performed by a DNS server, such as one or more of the DNS resolver 104, the root server 108, the TLD server 110, or the authoritative name server 112; or by a computing device in communication with a DNS system (e.g., the system 100). At step 302, a DNS cache (or a portion thereof) may be selected. For example, a DNS cache (or a portion thereof) may be selected on a cache-wide basis (e.g., for the entire system 100); at the top level basis (e.g., for the root server 108); at a domain-level basis (e.g., for a ".com" portion of the DNS cache for the TLD server 110); at a sub-domain basis (e.g., for a sub-domain(s) portion of the DNS cache for the TLD server 110); at an authoritative domain basis (e.g., for the authoritative name server 112); and/or at a specific level basis (e.g., cache records for a specific domain(s)).

At step 304, the DNS server or computing device performing the process 300 determines whether there are any cache records remaining in the DNS cache (or the portion thereof) selected at step 302. If no cache records are remaining to be processed, then the process 300 ends. Otherwise, the process 300 continues to step 306, where a portion of the remaining cache records associated with a unique time interval are selected. For example, the portion selected at step 306 may include all cache records existing at a particular time (e.g., all cache records existing as of May 5, 2020; 6:18 AM). Since cache records may have a time to live element that causes cache records to expire (e.g., be removed from the cache) after a period of time elapses, the portion of cache records selected at step 306 may include only active (e.g., unexpired) cache records with respect to the unique time interval.

At step 308, the DNS server or computing device performing the process 300 may generate a representation for the portion of cache records selected at step 306. Generating the representation may comprise a function (e.g., a strongly collision-free hashing function) that converts aspects of the portion of cache records selected at step 306 into a value(s) representing each aspect. The representation may be indicative of a state of the DNS cache based on the portion of cache records. For example, the representation may comprise a fingerprint of the DNS cache, a snapshot of the DNS cache, a digest of the DNS cache, an extract of the DNS cache based on the portion of cache records, a compendium of the DNS cache based on the portion of cache records, a summary of the DNS cache based on the portion of cache records, a combination thereof, and/or the like. For example, the portion of cache records selected at step 306 may comprise a plurality of cache attribute such as one or more of the elements shown in FIGS. 2A and 2B, such as data representing the first portion 204 and the second portion 208; an alias name for a website (e.g., "www.example.com"); the true domain name 206 for the website stored within the second portion 208 (e.g., "star-mini.c10r.example.com"); and/or the IP address for the server associated with the website (e.g., 31.13.65.36). As another example, the plurality of cache attributes of the portion of cache records selected at step 306 may comprise one or more of a byte count of the DNS cache, a server name associated with a DNS resolution, a server location associated with a DNS resolution, or a visual representation of the DNS cache. The function used to generate the representation may generate one or more alphanumeric strings that represent the plurality of cache attributes. In this way, the plurality of cache attributes associated with the portion of cache records selected at step 306 may result in a representation that uniquely represents the plurality of cache attributes of the portion of cache records at the particular time.

After the representation is generated at step 308, the process 300 may return to step 304, and the DNS server or computing device performing the process 300 may again determine whether there are any cache records remaining in the DNS cache (or the portion thereof) selected at step 302. If no cache records are remaining, then the process 300 ends. Otherwise, the process 300 continues to step 306 at iterates until all remaining cache records are processed and a representation is generated for each portion thereof.

The plurality of representations generated via the process 300 may be used to train a machine learning model. The DNS server or computing device that performed the process 300, or any other computing device having access to the plurality of representations, may comprise a training module that is configured to train the machine learning model. The functionality of the training module and the process for training the machine learning model are further described herein with respect to FIG. 4.

Figure 4:
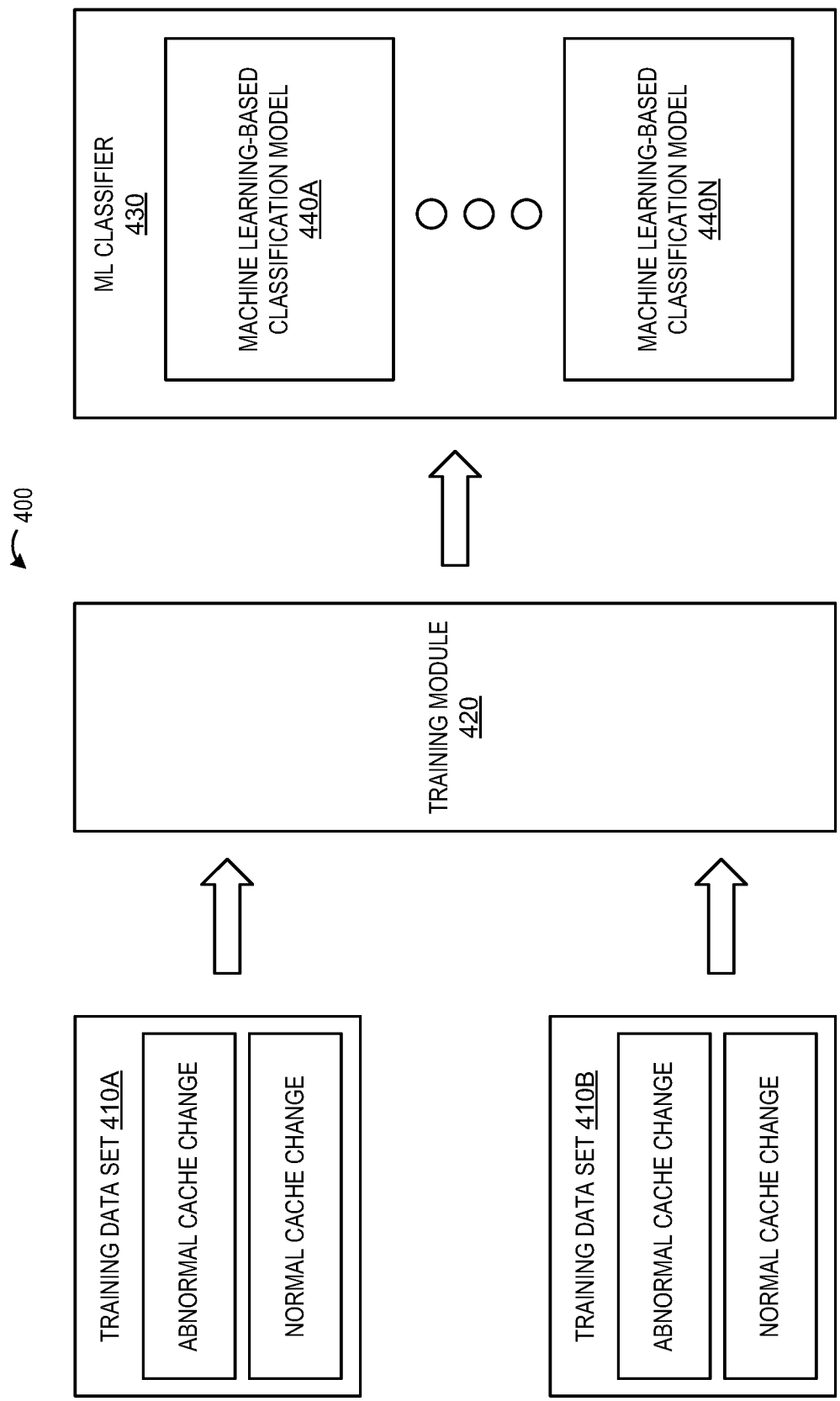
FIG. 4 shows an example machine learning system.

Turning now to FIG. 4, a system 400 is shown. The system 400 may be configured to use machine learning techniques to train, based on an analysis of one or more training datasets 410A-410B by a training module 420, at least one machine learning-based classifier 430. The at least one machine learning-based classifier 430, once trained, may be configured to classify changes in a DNS cache as being abnormal or normal. As described herein, the plurality of representations generated via the process 300 may be used by the training module 420 to train the at least one machine learning-based classifier 430. The training module 420 may select a first subset as well as a second subset of representations from the plurality of representations of the DNS cache for training the at least one machine learning-based classifier 430. The first subset of representations may be associated with at least one abnormal change in the DNS cache (e.g., a poisoning, a manipulation, an intrusion, etc.), while the second subset of representations may be associated with at least one normal change in the DNS cache.

The training dataset 410A (e.g., the first subset of representations) may comprise labeled representations (e.g., labeled as being associated with an at least one abnormal DNS cache change). The training dataset 410B (e.g., the second subset of representations) may also comprise labeled representations (e.g., labeled as being associated with an at least one normal DNS cache change). The labels may comprise abnormal and normal. The second subset of representations may be randomly assigned to the training dataset 410B or to a testing dataset. In some implementations, the assignment of data to a training dataset or a testing dataset may not be completely random. In this case, one or more criteria may be used during the assignment, such as ensuring that similar numbers of representations with different labels are in each of the training and testing datasets. In general, any suitable method may be used to assign the data to the training or testing datasets, while ensuring that the distributions of abnormal and normal labels are somewhat similar in the training dataset and the testing dataset.

The training module 420 may use the first subset and second subset of representations to determine one or more cache attributes indicative of at least one abnormal change in the DNS cache (e.g., a poisoning, a manipulation, an intrusion, etc.). That is, the training module 420 may determine which cache attributes present within the plurality of representations are correlative with an abnormal change in the DNS cache (e.g., a poisoning, a manipulation, an intrusion, etc.). The one or more cache attributes indicative of the at least one abnormal change in the DNS cache may be used by the training module 420 to train the machine learning-based classifier 430. For example, the training module 420 may train the machine learning-based classifier 430 by extracting a feature set from the first subset of representations (e.g., labeled as being associated with at least one abnormal change) in the training dataset 410A according to one or more feature selection techniques. The training module 420 may further define the feature set obtained from the training dataset 410A by applying one or more feature selection techniques to the second subset of representations (e.g., labeled as being associated with at least one normal change) in the training dataset 410B that includes statistically significant features of positive examples (e.g., abnormal) and statistically significant features of negative examples (e.g., labeled as being normal). The training module 420 may train the machine learning-based classifier 430 by extracting a feature set from the training dataset 410B that includes statistically significant features of positive examples (e.g., abnormal) and statistically significant features of negative examples (e.g., normal).

The training module 420 may extract a feature set from the training dataset 410A and/or the training dataset 410B in a variety of ways. The training module 420 may perform feature extraction multiple times, each time using a different feature-extraction technique. In one example, the feature sets generated using the different techniques may each be used to generate different machine learning-based classification models 440. For example, the feature set with the highest quality metrics may be selected for use in training. The training module 420 may use the feature set(s) to build one or more machine learning-based classification models 440A-440N that are configured to indicate whether or not new data is associated with an abnormal or a normal change(s) in a DNS cache.

The training dataset 410A and/or the training dataset 410B may be analyzed to determine any dependencies, associations, and/or correlations between cache attributes and the abnormal/normal labels in the training dataset 410A and/or the training dataset 410B. The identified correlations may have the form of a list of cache attributes that are associated with different abnormal/normal labels. The cache attributes may be considered as features (or variables) in the machine learning context. The term "feature," as used herein, may refer to any characteristic of an item of data that may be used to determine whether the item of data falls within one or more specific categories. By way of example, the features described herein may comprise one or more cache attributes. The one or more cache attributes may include a byte count of a DNS cache, a server name associated with a DNS resolution, a server location associated with a DNS resolution, or a visual representation of a DNS cache, a combination thereof and/or the like. The one or more cache attributes may also include one or more of the elements shown in FIGS. 2A and 2B, such as data representing the first portion 204 and the second portion 208; an alias name for a website (e.g., "www.example.com"); the true domain name 206 for the website stored within the second portion 208 (e.g., "star-mini.c10r.example.com"); the IP address for the server associated with the website (e.g., 31.13.65.36); a combination thereof and/or the like.

A feature selection technique may comprise one or more feature selection rules. The one or more feature selection rules may comprise a cache attribute occurrence rule. The cache attribute occurrence rule may comprise determining which cache attributes in the training dataset 410A occur over a threshold number of times and identifying those cache attributes that satisfy the threshold as candidate features. For example, any cache attributes that appear greater than or equal to 5 times in the training dataset 410A may be considered as candidate features. Any cache attributes appearing less than 5 times may be excluded from consideration as a feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the cache attribute occurrence rule may be applied to the training dataset 410A to generate a first list of cache attributes. A final list of candidate cache attributes may be analyzed according to additional feature selection techniques to determine one or more candidate cache attribute groups (e.g., groups of cache attributes that may be used to predict whether a change in a DNS cache is abnormal or normal). Any suitable computational technique may be used to identify the candidate cache attribute groups using any feature selection technique such as filter, wrapper, and/or embedded methods. One or more candidate cache attribute groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 400. Instead, features may be selected on the basis of scores in various statistical tests for their correlation with the outcome variable (e.g., abnormal/normal).

As another example, one or more candidate cache attribute groups may be selected according to a wrapper method. A wrapper method may be configured to use a subset of features and train the machine learning-based classifier 430 using the subset of features. Based on the inferences that drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate cache attribute groups. Forward feature selection is an iterative method that begins with no features. In each iteration, the feature which best improves the model is added until an addition of a new variable does not improve the performance of the model. As another example, backward elimination may be used to identify one or more candidate cache attribute groups. Backward elimination is an iterative method that begins with all features in the model. In each iteration, the least significant feature is removed until no improvement is observed on removal of features. Recursive feature elimination may be used to identify one or more candidate cache attribute groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate cache attribute groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 420 has generated a feature set(s), the training module 420 may generate the one or more machine learning-based classification models 440A-440N based on the feature set(s). A machine learning-based classification model (e.g., any of the one or more machine learning-based classification models 440A-440N) may refer to a complex mathematical model for data classification that is generated using machine-learning techniques as described herein. In one example, a machine learning-based classification model may include a map of support vectors that represent boundary features. By way of example, boundary features may be selected from, and/or represent the highest-ranked features in, a feature set.

The training module 420 may use the feature sets extracted from the training dataset 410A and/or the training dataset 410B to build the one or more machine learning-based classification models 440A-440N for each classification category (e.g., abnormal, normal). In some examples, the one or more machine learning-based classification models 440A-440N may be combined into a single machine learning-based classification model 440 (e.g., an ensemble model). Similarly, the machine learning-based classifier 430 may represent a single classifier containing a single or a plurality of machine learning-based classification models 440 and/or multiple classifiers containing a single or a plurality of machine learning-based classification models 440 (e.g., an ensemble classifier).

The extracted features (e.g., one or more candidate cache attributes) may be combined in the one or more machine learning-based classification models 440A-440N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 430 may comprise a decision rule or a mapping for each candidate cache attribute in order to assign a change in a DNS cache to a class (abnormal, normal). As described further herein, the resulting machine learning-based classifier 430 may be used to generate one or more alert rules, which may be configured to detect one or more abnormal changes in a DNS cache.

The candidate cache attribute and the machine learning-based classifier 430 may be used to predict the abnormal/normal classification of DNS cache changes in the test representations in the testing dataset. In one example, the prediction result for each test representation includes a confidence level that corresponds to a likelihood or a probability that the corresponding DNS cache change for a test representation belongs in the predicted abnormal/normal classification. The confidence level may be a value between zero and one, and it may represent a likelihood that the corresponding DNS cache change for a test representation belongs to an abnormal/normal classification. In one example, when there are two classifications (e.g., abnormal and normal), the confidence level may correspond to a value p, which refers to a likelihood that a particular DNS cache change for a test representation belongs to the first classification (e.g., abnormal). In this case, the value 1−p may refer to a likelihood that the particular DNS cache change for the particular test representation belongs to the second classification (e.g., normal). In general, multiple confidence levels may be provided for each test representation and for each candidate cache attribute when there are more than two classifications. A top performing candidate cache attribute may be determined by comparing the result obtained for each test representation with the known abnormal/normal classification for each test representation. In general, the top performing candidate cache attribute will have results that closely match the known abnormal/normal classifications. The top performing candidate cache attribute may be used to predict the abnormal/normal classification of a change in a DNS cache. For example, a representation of a DNS cache may be determined/received. The representation may be indicative of one or more cache attributes associated with a change in a DNS cache. The representation may be indicative of a state of the DNS cache at a particular time or time interval. For example, the representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like. The representation may be provided to the machine learning-based classifier 430 which may, based on the top performing candidate cache attribute, classify the change in the DNS cache as being abnormal or as being normal.

Figure 5:
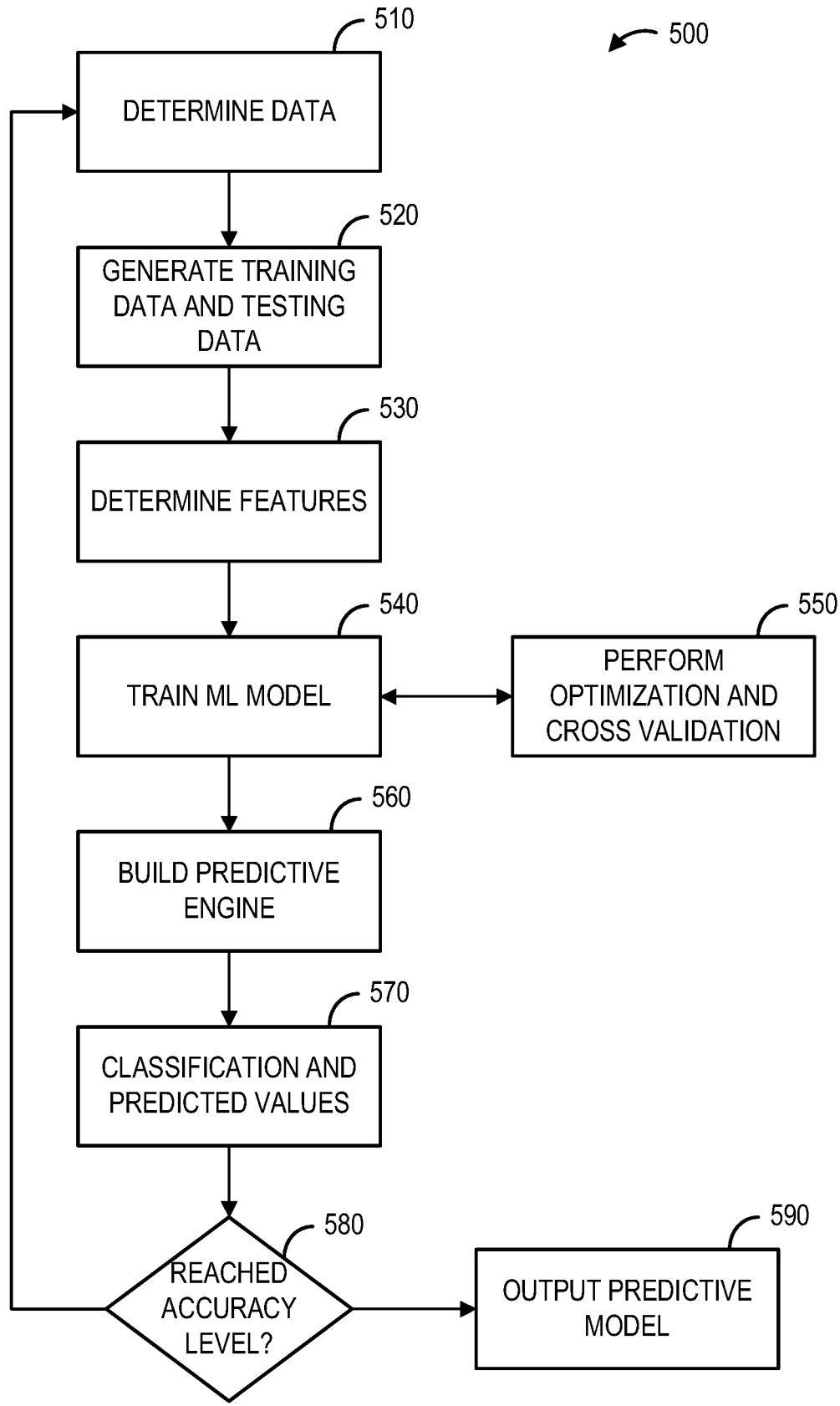
FIG. 5 shows an example process flowchart.

FIG. 5 is a flowchart illustrating an example training method 500 for generating the machine learning-based classifier 430 using the training module 420. The training module 420 can implement supervised, unsupervised, and/or semi-supervised (e.g., reinforcement based) machine learning-based classification models 440. The method 500 illustrated in FIG. 5 is an example of a supervised learning method; variations of this example of training method are discussed below, however, other training methods can be analogously implemented to train unsupervised and/or semi-supervised machine learning models.

The training method 500 may determine (e.g., access, receive, retrieve, etc.) first representations (e.g., the first subset of representations described above) and second representations (e.g., the second subset of representations described above) at step 510. The first representations and the second representations may each comprise sets of representations of one or more Domain Name System ("DNS") caches at particular time intervals or period of times, and each of the one or more DNS caches may be associated with cache records for a plurality of domains (e.g., websites). The plurality of domains may not overlap between the first representations and the second representations. That is, the first representations may be associated with cache records for one or more domains of the plurality of domains that are not represented in any of the second representations—and vice-versa. Each set of representations of the one or more DNS caches may comprise a plurality of cache attributes. For example, the plurality of cache attributes may comprise data representing portions of DNS cache records (e.g., such as those shown in FIGS. 2A and 2B). As another example, the plurality of cache attributes may comprise one or more of a byte count of a DNS cache, a server name associated with a DNS resolution, a server location associated with a DNS resolution, or a visual representation of the DNS cache. Each set of representations of the one or more DNS caches may include a labeled list(s) of DNS cache changes. The labels may comprise abnormal or normal.

The training method 500 may generate, at step 520, a training dataset and a testing dataset. The training dataset and the testing dataset may be generated by randomly assigning labeled representations from the second representations to either the training dataset or the testing dataset. In some implementations, the assignment of representations as training or test samples may not be completely random. As an example, only the labeled representations for a specific type of DNS cache change may be used to generate the training dataset and the testing dataset. As another example, a majority of the labeled representations for the specific type of DNS cache change may be used to generate the training dataset. For example, 75% of the labeled representations for the specific type of DNS cache change may be used to generate the training dataset and 25% may be used to generate the testing dataset.

The training method 500 may determine (e.g., extract, select, etc.), at step 530, one or more features that can be used by, for example, a classifier to differentiate among different classifications (e.g., abnormal vs. normal). The one or more features may comprise a set of cache attributes. As an example, the training method 500 may determine a set features from the first representations. As another example, the training method 500 may determine a set of features from the second representations. In a further example, a set of features may be determined from labeled representations for a type of DNS cache change that may be different than the type of DNS cache change associated with the labeled representations of the training dataset and the testing dataset. In other words, labeled representations from the different type of DNS change may be used for feature determination, rather than for training a machine learning model. The training dataset may be used in conjunction with the labeled representations from the different types of DNS cache changes to determine the one or more features. The labeled representations from the different type of DNS cache change may be used to determine an initial set of features, which may be further reduced using the training dataset.

The training method 500 may train one or more machine learning models using the one or more features at step 540. In one example, the machine learning models may be trained using supervised learning. In another example, other machine learning techniques may be employed, including unsupervised learning and semi-supervised. The machine learning models trained at 540 may be selected based on different criteria depending on the problem to be solved and/or data available in the training dataset. For example, machine learning classifiers can suffer from different degrees of bias. Accordingly, more than one machine learning models can be trained at 440, optimized, improved, and cross-validated at step 550.

The training method 500 may select one or more machine learning models to build a predictive model at 560 (e.g., a machine learning classifier). The predictive model may be evaluated using the testing dataset. The predictive model may analyze the testing dataset and generate classification values and/or predicted values at step 570. Classification and/or prediction values may be evaluated at step 580 to determine whether such values have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified one or more changes in a DNS cache as abnormal that was in reality normal. Conversely, the false negatives of the predictive model may refer to a number of times the machine learning model classified one or more changes in a DNS cache as normal when, in fact, the one or more changes in the DNS cache were abnormal. True negatives and true positives may refer to a number of times the predictive model correctly classified one or more changes in a DNS cache as abnormal or normal. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model may be output at step 590; when the desired accuracy level is not reached, however, then a subsequent iteration of the training method 500 may be performed starting at step 510 with variations such as, for example, considering a larger collection of representations.

The predictive model output at step 590 may comprise a plurality of alert rules as described herein, which may be configured to detect one or more further abnormal changes in a particular DNS cache (e.g., a poisoning, a manipulation, an intrusion, etc.). Each of the plurality of alert rules may be associated with one or more cache attributes and a level of confidence that the particular DNS cache has been poisoned or manipulated. In this way, certain cache attributes present within a representation for the particular DNS cache may correspond to one or more particular alert rules that are associated with those cache attributes. For example, a first alert rule may be associated with changes in a size of a byte count for a DNS cache of a particular domain at particular times of a day or over particular periods of time. The first alert rule may indicate that a representation indicating a change in the size of the byte count for the DNS cache of the particular domain above or below a specified percentage (e.g., an absolute value for a change in size greater than 20%) at a specified time of the date or over a specified period of time is associated with a 70% level of confidence that the particular DNS cache has been poisoned or manipulated.

Figure 6:
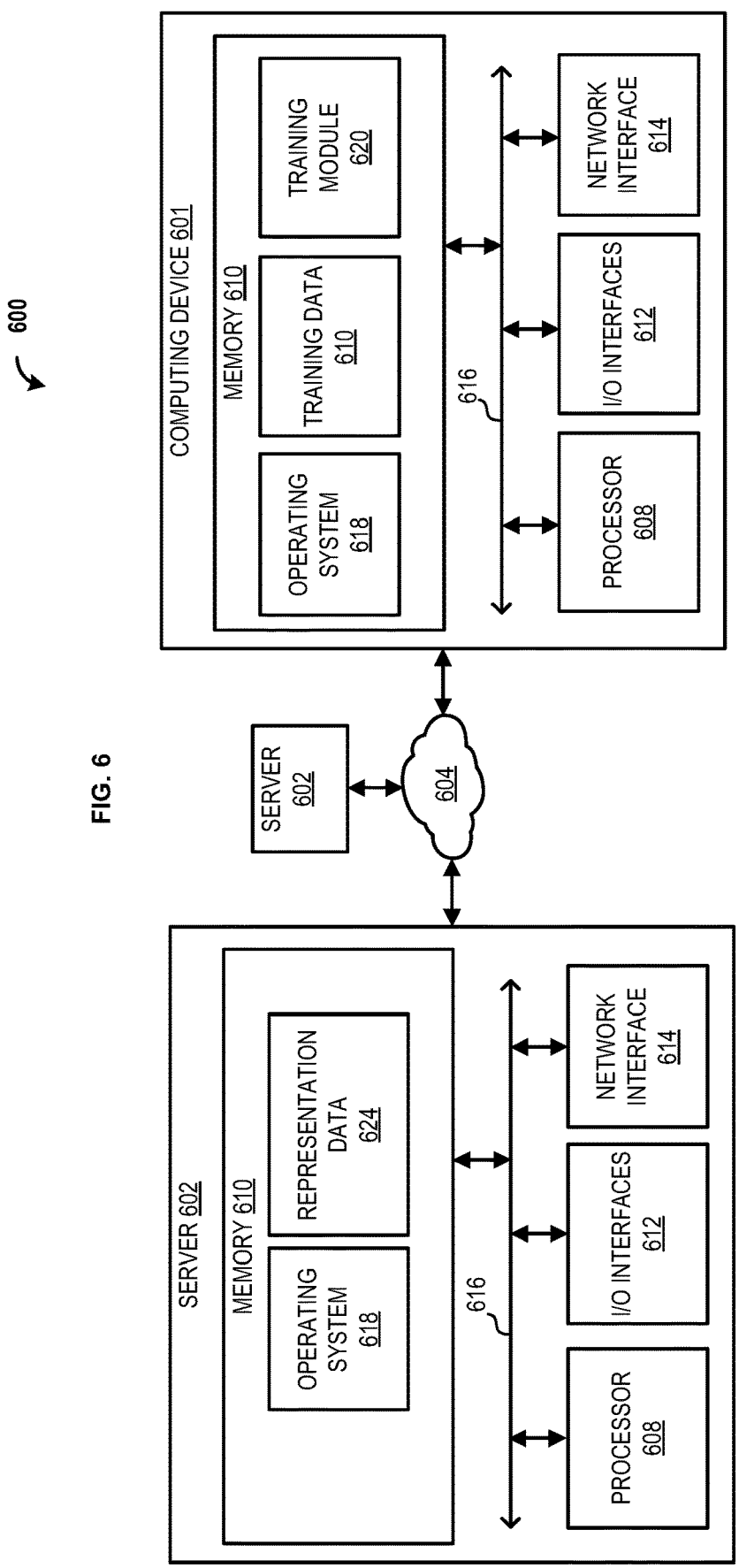
FIG. 6 shows an example system.

As discussed herein, the present methods and systems may be computer-implemented. FIG. 6 shows a block diagram depicting an environment 600 comprising non-limiting examples of a computing device 601 and a server 602 connected through a network 604. The computing device 601 and/or the server 602 may be any one of the DNS resolver 104, the root server 108, the TLD server 110, and the authoritative name server 112 of FIG. 1. In an aspect, some or all steps of any described method may be performed on a computing device as described herein. The computing device 601 can comprise one or multiple computers configured to store one or more of the training module 420, training data 410 (e.g., labeled Domain Name System ("DNS") cache changes), and the like. The server 602 can comprise one or multiple computers configured to store representations 624 (e.g., a plurality of historical DNS cache representations). Multiple servers 602 can communicate with the computing device 601 via the through the network 604.

The computing device 601 and the server 602 can be a digital computer that, in terms of hardware architecture, generally includes a processor 608, memory system 610, input/output (I/O) interfaces 612, and network interfaces 614. These components (608, 610, 612, and 614) are communicatively coupled via a local interface 616. The local interface 616 can be, for example, but not limited to, one or more buses or other wired or wireless connections, as is known in the art. The local interface 616 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 608 can be a hardware device for executing software, particularly that stored in memory system 610. The processor 608 can be any custom made or commercially available processor, a central processing unit (CPU), an auxiliary processor among several processors associated with the computing device 601 and the server 602, a semiconductor-based microprocessor (in the form of a microchip or chip set), or generally any device for executing software instructions. When the computing device 601 and/or the server 602 is in operation, the processor 608 can be configured to execute software stored within the memory system 610, to communicate data to and from the memory system 610, and to generally control operations of the computing device 601 and the server 602 pursuant to the software.

The I/O interfaces 612 can be used to receive user input from, and/or for providing system output to, one or more devices or components. User input can be provided via, for example, a keyboard and/or a mouse. System output can be provided via a display device and a printer (not shown). I/O interfaces 612 can include, for example, a serial port, a parallel port, a Small Computer System Interface (SCSI), an infrared (IR) interface, a radio frequency (RF) interface, and/or a universal serial bus (USB) interface.

The network interface 614 can be used to transmit and receive from the computing device 601 and/or the server 602 on the network 604. The network interface 614 may include, for example, a 10 BaseT Ethernet Adaptor, a 100 BaseT Ethernet Adaptor, a LAN PHY Ethernet Adaptor, a Token Ring Adaptor, a wireless network adapter (e.g., WiFi, cellular, satellite), or any other suitable network interface device. The network interface 614 may include address, control, and/or data connections to enable appropriate communications on the network 604.

The memory system 610 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 610 may incorporate electronic, magnetic, optical, and/or other types of storage media. Note that the memory system 610 can have a distributed architecture, where various components are situated remote from one another, but can be accessed by the processor 608.

The software in memory system 610 may include one or more software programs, each of which comprises an ordered listing of executable instructions for implementing logical functions. In the example of FIG. 6, the software in the memory system 610 of the computing device 601 can comprise the training module 420 (or subcomponents thereof), the training data 420, and a suitable operating system (O/S) 618. In the example of FIG. 6, the software in the memory system 610 of the server 602 can comprise, the representations 624, and a suitable operating system (O/S) 618. The operating system 618 essentially controls the execution of other computer programs and provides scheduling, input-output control, file and data management, memory management, and communication control and related services.

For purposes of illustration, application programs and other executable program components such as the operating system 618 are illustrated herein as discrete blocks, although it is recognized that such programs and components can reside at various times in different storage components of the computing device 601 and/or the server 602. An implementation of the training module 420 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 7, a flowchart of an example method 700 for improved domain name system (DNS) security is shown. The method 700 may be performed in whole or in part by a single computing device, a plurality of computing devices, and the like. For example, the DNS resolver 104, the root server 108, the TLD server 110, the authoritative name server 112, the training module 420, the computing device 601, and/or the server 602 may be configured to perform the method 700.

At step 710, a computing device of a DNS, such as a recursive DNS server and/or a DNS resolver, may receive a plurality of representations of the DNS cache. Each representation of the plurality of representations may be indicative of a state of the DNS cache at a particular time or time interval. For example, each representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like. The plurality of representations may be associated with a single server of the DNS or multiple servers of the DNS. The plurality of representations may be associated with an entire DNS cache (e.g., for multiple domains/websites) or with less than the entire DNS cache. For example, the plurality of representations may capture a DNS cache on a cache-wide basis (e.g., for the entire DNS); at the top level basis (e.g., for a top-level DNS server); a domain-level basis (e.g., for a ".com" DNS server); at a sub-domain basis (e.g., for a sub-domain DNS server); at an authoritative domain basis (e.g., for an authoritative domain name server); and/or at a specific level basis (e.g., cache records for a specific domain). Each representation of the plurality of representations may comprise a plurality of cache attributes associated with the DNS cache at a unique time interval, such a byte count of the DNS cache, a server name associated with a DNS resolution, a server location associated with a DNS resolution, or a visual representation of the DNS cache.

At step 720, the computing device may select a first subset as well as a second subset of representations from the plurality of representations of the DNS cache. The first subset of representations may be associated with at least one abnormal change in the DNS cache (e.g., a poisoning, a manipulation, an intrusion, etc.), while the second subset of representations may be associated with at least one normal change in the DNS cache. An example of a "normal" change in the DNS cache may include an increase or a decrease in a byte count of the DNS cache for a domain(s) over a period of time that corresponds to typical traffic changes for the domain(s) (e.g., the byte count of the DNS cache may be higher during periods of high traffic when more servers for a domain(s) are active, and vice-versa). Another example of a "normal" change in the DNS cache may include a server name and/or a server location associated with one or more DNS resolutions for a domain(s) that does not differ greatly from previous DNS resolutions for the domain(s) (e.g., historical records may show that the domain(s) may use servers with related names and/or locations). A further example of a "normal" change in the DNS cache may include an expected change in a visual representation of the DNS cache for a domain(s) (e.g., an expected change in a diagram of the DNS cache showing a level of interconnectedness between various servers). An "abnormal" change in the DNS cache may include the converse of any of the preceding examples of a "normal" change in the DNS cache. Such abnormal changes may be indicative of a poisoning or a manipulation of the DNS cache. What constitutes an "abnormal" change versus a "normal" change within the plurality of representations of the DNS cache may be determined by a network administrator or another computing device. For example, the network administrator or the other computing device may label the at least one abnormal change in the DNS cache and the at least one normal change in the DNS cache as such. In other words, the network administrator or the other computing device may determine a ground truth that the machine learning model may use as a basis for classifying further changes in the DNS cache as being "normal" or "abnormal."

At step 730, the computing device may determine one or more cache attributes indicative of the at least one abnormal change in the DNS cache. For example, the computing device may determine which cache attributes present within the plurality of representations are correlative with an abnormal change in the DNS cache (e.g., a poisoning, a manipulation, an intrusion, etc.). In doing so, the computing device may implement one or more of the feature selection processes described in FIG. 4 and/or FIG. 5 herein. At step 740, the computing device may train a machine learning model. For example, the computing device may use the one or more cache attributes indicative of the at least one abnormal change in the DNS cache to train the machine learning model. In training the machine learning model, the computing device may implement one or more of the training processes described in FIG. 4 and/or FIG. 5 herein.

At step 750, the trained machine learning model may be output by the computing device as a plurality of alert rules, which may be configured to detect one or more further abnormal changes in the DNS cache (e.g., a poisoning, a manipulation, an intrusion, etc.). Each of the plurality of alert rules may be associated with one or more cache attributes and a level of confidence that the particular DNS cache has been poisoned or manipulated. In this way, certain cache attributes present within a representation for the particular DNS cache may correspond to one or more particular alert rules that are associated with those cache attributes. For example, a first alert rule may be associated with changes in a size of a byte count for a DNS cache of a particular domain at particular times of a day or over particular periods of time. The first alert rule may indicate that a representation indicating a change in the size of the byte count for the DNS cache of the particular domain above or below a specified percentage (e.g., an absolute value for a change in size greater than 20%) at a specified time of the date or over a specified period of time is associated with a 70% level of confidence that the particular DNS cache has been poisoned or manipulated.

The computing device may receive a further representation of the DNS cache. The computing device may provide the further representation to the trained machine learning model to determine whether one or more attributes of the further representation are indicative of a poisoning or a manipulation of the DNS cache. At step 760, the computing device—via the trained machine learning model—may determine that the one or more attributes of the further representation satisfy one or more of the plurality of alert rules. For example, the one or more of the plurality of alert rules may be satisfied when the trained machine learning model determines with a level of confidence above a threshold that the one or more attributes of the further representation are associated with one or more further abnormal changes to the DNS cache (e.g., a poisoning, a manipulation, an intrusion, etc.). In other words, satisfaction of one or more of the plurality of alert rules may indicate that the DNS cache has been poisoned or manipulated. At step 770, the computing device may cause a remedial action to be performed on the DNS cache. The computing device may cause the remedial action to be performed based on determining that the one or more attributes of the further representation satisfy the one or more of the plurality of alert rules. The remedial action may comprise, as an example, sending an alert to an administrator of the DNS cache. The alert may identify the one or more further abnormal changes to the DNS cache (e.g., a poisoning, a manipulation, an intrusion, etc.). As another example, the remedial action may comprise clearing (e.g., deleting and/or purging from the cache) one or more records of the DNS cache (e.g., those suspected to be poisoned or manipulated). Other remedial actions are possible as well.

Turning now to FIG. 8, a flowchart of an example method 800 for improved domain name system (DNS) security is shown. The method 800 may be performed in whole or in part by a single computing device, a plurality of computing devices, and the like. For example, the DNS resolver 104, the root server 108, the TLD server 110, the authoritative name server 112, the training module 420, the computing device 601, and/or the server 602 may be configured to perform the method 800. The method 800 may be implemented to train a machine learning model, such as the at least one machine learning-based classifier 430.

At step 810, a computing device of a DNS, such as a recursive DNS server and/or a DNS resolver, may receive a plurality of representations of the DNS cache. Each representation of the plurality of representations may be indicative of a state of the DNS cache at a particular time or time interval. For example, each representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like. The plurality of representations may be associated with a single server of the DNS or multiple servers of the DNS. The plurality of representations may be associated with an entire DNS cache (e.g., for multiple domains/websites) or with less than the entire DNS cache. For example, the plurality of representations may capture a DNS cache on a cache-wide basis (e.g., for the entire DNS); at the top level basis (e.g., for a top-level DNS server); a domain-level basis (e.g., for a ".com" DNS server); at a sub-domain basis (e.g., for a sub-domain DNS server); at an authoritative domain basis (e.g., for an authoritative domain name server); and/or at a specific level basis (e.g., cache records for a specific domain). Each representation of the plurality of representations may comprise a plurality of cache attributes associated with the DNS cache at a unique time interval, such a byte count of the DNS cache, a server name associated with a DNS resolution, a server location associated with a DNS resolution, or a visual representation of the DNS cache.

The computing device may select a first subset as well as a second subset of representations from the plurality of representations of the DNS cache. The first subset of representations may be associated with at least one abnormal change in the DNS cache (e.g., a poisoning, a manipulation, an intrusion, etc.), while the second subset of representations may be associated with at least one normal change in the DNS cache. An example of a "normal" change in the DNS cache may include an increase or a decrease in a byte count of the DNS cache for a domain(s) over a period of time that corresponds to typical traffic changes for the domain(s) (e.g., the byte count of the DNS cache may be higher during periods of high traffic when more servers for a domain(s) are active, and vice-versa). Another example of a "normal" change in the DNS cache may include a server name and/or a server location associated with one or more DNS resolutions for a domain(s) that does not differ greatly from previous DNS resolutions for the domain(s) (e.g., historical records may show that the domain(s) may use servers with related names and/or locations). A further example of a "normal" change in the DNS cache may include an expected change in a visual representation of the DNS cache for a domain(s) (e.g., an expected change in a diagram of the DNS cache showing a level of interconnectedness between various servers). An "abnormal" change in the DNS cache may include the converse of any of the preceding examples of a "normal" change in the DNS cache. Such abnormal changes may be indicative of a poisoning or a manipulation of the DNS cache. What constitutes an "abnormal" change versus a "normal" change within the plurality of representations of the DNS cache may be determined by a network administrator or another computing device. For example, the network administrator or the other computing device may label the at least one abnormal change in the DNS cache and the at least one normal change in the DNS cache as such. In other words, the network administrator or the other computing device may determine a ground truth that the machine learning model may use as a basis for classifying further changes in the DNS cache as being "normal" or "abnormal."

At step 820, the computing device may determine at least one representation of the plurality of representations associated with at least one abnormal change in the DNS cache (e.g., a poisoning, a manipulation, an intrusion, etc.). For example, at least one representation may be part of the first subset of representations. At step 830, the computing device may determine one or more cache attributes indicative of the at least one abnormal change in the DNS cache. For example, the computing device may determine which cache attributes present within the at least one representation are correlative with an abnormal change in the DNS cache (e.g., a poisoning, a manipulation, an intrusion, etc.). In doing so, the computing device may implement one or more of the feature selection processes described in FIG. 4 and/or FIG. 5 herein. The computing device may use the one or more cache attributes of the at least one representation that are indicative of the at least one abnormal change in the DNS cache to train the machine learning model. In training the machine learning model, the computing device may implement one or more of the training processes described in FIG. 4 and/or FIG. 5 herein.

At step 840, the computing device may generate a plurality of alert rules that are configured to detect one or more further abnormal changes in the DNS cache (e.g., a poisoning, a manipulation, an intrusion, etc.). For example, the plurality of alert rules may be output by the computing device and provided to another computing device of the DNS (e.g., another recursive DNS server or another DNS resolver). Each of the plurality of alert rules may be associated with one or more cache attributes and a level of confidence that the particular DNS cache has been poisoned or manipulated. In this way, certain cache attributes present within a representation for the particular DNS cache may correspond to one or more particular alert rules that are associated with those cache attributes.

Turning now to FIG. 9, a flowchart of an example method 900 for improved domain name system (DNS) security is shown. The method 900 may be performed in whole or in part by a single computing device, a plurality of computing devices, and the like. For example, the DNS resolver 104, the root server 108, the TLD server 110, the authoritative name server 112, the training module 420, the computing device 601, and/or the server 602 may be configured to perform the method 900. The method 900 may be implemented when using a trained machine learning model, such as the at least one machine learning-based classifier 430.

At step 910, a computing device may receive a representation of a DNS cache. Each representation of the plurality of representations may be indicative of a state of the DNS cache at a particular time or time interval. For example, each representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like. The representation may be associated with a single server of the DNS or multiple servers of the DNS. The representation may be associated with an entire DNS cache (e.g., for multiple domains/websites) or with less than the entire DNS cache. For example, the representation may capture a DNS cache on a cache-wide basis (e.g., for the entire DNS); at the top level basis (e.g., for a top-level DNS server); a domain-level basis (e.g., for a ".com" DNS server); at a sub-domain basis (e.g., for a sub-domain DNS server); at an authoritative domain basis (e.g., for an authoritative domain name server); and/or at a specific level basis (e.g., cache records for a specific domain). The representation may comprise a plurality of cache attributes associated with the DNS cache at a unique time interval, such a byte count of the DNS cache, a server name associated with a DNS resolution, a server location associated with a DNS resolution, or a visual representation of the DNS cache.

The computing device may provide the representation to a trained machine learning model. The trained machine learning model may comprise a plurality of alert rules that are configured to detect abnormal changes in the DNS cache. For example, the plurality of alert rules may be output by a computing device that trains the machine learning model and provides the trained machine learning model (e.g., the plurality of alert rules) to the computing device performing the method 900. Each of the plurality of alert rules may be associated with one or more cache attributes and a level of confidence that the DNS cache has been poisoned or manipulated. In this way, certain cache attributes present within the representation may correspond to one or more particular alert rules that are associated with those cache attributes.

At step 920, the computing device may determine that one or more of a plurality of cache attributes of the representation is indicative of at least one abnormal change in the DNS cache (e.g., a poisoning, a manipulation, an intrusion, etc.). For example, the computing device may—via the trained machine learning model—determine that the one or more of the plurality of cache attributes of the representation satisfy one or more of the plurality of alert rules. For example, the one or more of the plurality of alert rules may be satisfied when the trained machine learning model determines with a level of confidence above a threshold that the one or more of the plurality of cache attributes of the representation are associated with one more abnormal changes to the DNS cache. In other words, satisfaction of one or more of the plurality of alert rules may indicate that the DNS cache has been poisoned or manipulated. At step 930, the computing device may cause a remedial action to be performed on the DNS cache. The computing device may cause the remedial action to be performed based on determining that the one or more attributes of the further representation satisfy the one or more of the plurality of alert rules. The remedial action may comprise, as an example, sending an alert to an administrator of the DNS cache. The alert may identify the one or more further abnormal changes to the DNS cache (e.g., a poisoning, a manipulation, an intrusion, etc.). As another example, the remedial action may comprise clearing (e.g., deleting) one or more records of the DNS cache (e.g., those suspected to be poisoned or manipulated). Other remedial actions are possible as well.

Turning now to FIG. 10, a flowchart of an example method 1000 for improved domain name system (DNS) security is shown. The method 1000 may be performed in whole or in part by a single computing device. For example, the DNS resolver 104 may be configured to perform the method 1000. The method 1000 may be implemented when using a trained machine learning model, such as the at least one machine learning-based classifier 430.

At step 1010, a DNS resolver may receive a representation of a DNS cache. Each representation of the plurality of representations may be indicative of a state of the DNS cache at a particular time or time interval. For example, each representation may comprise a fingerprint of the DNS cache, a snapshot of the DNS cache, a digest of the DNS cache, an extract of the DNS cache, a compendium of the DNS cache, a summary of the DNS cache, a combination thereof, and/or the like. The representation may be associated with a single server of the DNS or multiple servers of the DNS. The representation may be associated with an entire DNS cache (e.g., for multiple domains/websites) or with less than the entire DNS cache. For example, the representation may capture a DNS cache on a cache-wide basis (e.g., for the entire DNS); at the top level basis (e.g., for a top-level DNS server); a domain-level basis (e.g., for a ".com" DNS server); at a sub-domain basis (e.g., for a sub-domain DNS server); at an authoritative domain basis (e.g., for an authoritative domain name server); and/or at a specific level basis (e.g., cache records for a specific domain). The representation may comprise a plurality of cache attributes associated with the DNS cache at a unique time interval, such a byte count of the DNS cache, a server name associated with a DNS resolution, a server location associated with a DNS resolution, or a visual representation of the DNS cache.

The DNS resolver may provide the representation to a trained machine learning model. The trained machine learning model may comprise a plurality of alert rules that are configured to detect abnormal changes in the DNS cache. For example, the plurality of alert rules may be output by a computing device that trains the machine learning model and provides the trained machine learning model (e.g., the plurality of alert rules) to the DNS resolver. Each of the plurality of alert rules may be associated with one or more cache attributes and a level of confidence that the DNS cache has been poisoned or manipulated. In this way, certain cache attributes present within the representation may correspond to one or more particular alert rules that are associated with those cache attributes.

At step 1020, the DNS resolver may determine that one or more of a plurality of cache attributes of the representation is indicative of at least one abnormal change in the DNS cache (e.g., a poisoning, a manipulation, an intrusion, etc.). For example, the computing device may—via the trained machine learning model—determine that the one or more of the plurality of cache attributes of the representation satisfy one or more of the plurality of alert rules. For example, the one or more of the plurality of alert rules may be satisfied when the trained machine learning model determines with a level of confidence above a threshold that the one or more of the plurality of cache attributes of the representation are associated with one more abnormal changes to the DNS cache. In other words, satisfaction of one or more of the plurality of alert rules may indicate that the DNS cache has been poisoned or manipulated. At step 1030, the DNS resolver may send an alert to another computing device associated with the DNS cache. For example, the DNS resolver may send the alert to one or more of a root server of the DNS (e.g., the root server 108), a Top Level domain (TLD) server of the DNS (e.g., the TLD server 110), or an authoritative name server of the DNS (e.g., the authoritative name server 112). As another example, the DNS resolver may send the alert to a monitoring service/system (e.g., a computing system/service for monitoring DNS traffic). The monitoring service/system may receive the alert and post/ issue the alert (or another related alert) on an RSS feed, via an email message(s), via a text alert(s), via a Tweet(s)™, a combination thereof, and/or the like. The alert may comprise an indication of the at least one abnormal change in the DNS cache, an indication of one or more of the plurality of cache attributes, an indication of the one or more of the plurality of alert rules that are determined to be satisfied, a combination thereof, and/or the like. The alert may cause the other computing device associated with the DNS cache to cause a remedial action to be performed on the DNS cache. The remedial action may comprise, as an example, sending an alert to an administrator of the DNS cache. As another example, the remedial action may comprise clearing (e.g., deleting) one or more records of the DNS cache (e.g., those suspected to be poisoned or manipulated). Other remedial actions are possible as well.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, at a computing device, a plurality of representations of a domain name system (DNS) cache, wherein each representation of the plurality of representations comprises a plurality of cache attributes associated with the DNS cache;
determining, based on the plurality of representations, first subset of the plurality of representations associated with a manipulation of the DNS cache and a second subset of the plurality of representations associated with one or more normal change in the DNS cache;
determining, based on the first subset and the second subset, one or more cache attributes indicative of the manipulation of the DNS cache; and
training, based on the one or more determined cache attributes indicative of the manipulation of the DNS cache, a machine learning model, wherein the trained machine learning model is configured to detect one or more changes in the one or more cache attributes indicative of the manipulation of the DNS cache, and cause a remedial action to be performed on the computing device associated with the DNS cache.

2. The method of claim 1, wherein each representation of the plurality of representations is associated with a unique time interval.

3. The method of claim 1, wherein at least one representation of the first subset is associated with a malicious attack on the DNS cache.

4. The method of claim 1, wherein the plurality of cache attributes associated with the DNS cache comprise one or more of a byte count of the DNS cache, a server name associated with a DNS resolution, a server location associated with the DNS resolution, or a visual representation of the DNS cache.

5. The method of claim 4, wherein the one or more changes in the one or more cache attributes indicative of the manipulation are associated with at least one representation of the first subset, and wherein the at least one representation of the first subset is associated with an abnormal change in one or more of the byte count of the DNS cache, the server name associated with the DNS resolution, the server location associated with the DNS resolution, or the visual representation of the DNS cache.

6. The method of claim 1, wherein the DNS cache is associated with one or more of a root server of the DNS cache, a top-level server of the DNS cache, or an authoritative name server of the DNS cache.

7. The method of claim 1, further comprising:
outputting the trained machine learning model as a plurality of alert rules.

8. A method comprising:
receiving, at a computing device, a representation of a domain name system (DNS) cache, wherein the representation comprises a plurality of cache attributes associated with the DNS cache;
providing the plurality of cache attributes to a trained machine learning model, wherein the trained machine learning model is configured to detect one or more changes in the plurality of cache attributes indicative of manipulation of the DNS cache, wherein the trained machine learning model is trained on a first subset of a plurality of historical representations associated with one or more historical abnormal change in the DNS cache and a second subset of the plurality of historical representations associated with one or more historical normal change in the DNS cache; and
causing, based on the one or more changes in the plurality of cache attributes being indicative of the manipulation of the DNS cache, a remedial action to be performed on a computing device associated with the DNS cache.

9. The method of claim 8, wherein the representation and the manipulation are associated with a malicious attack on the DNS cache.

10. The method of claim 8, wherein the manipulation comprises one or more of an abnormal change in a byte count of the DNS cache, an abnormal change in a server name associated with a DNS resolution, an abnormal change in a server location associated with a DNS resolution, or an abnormal change in a visual representation of the DNS cache.

11. The method of claim 8, wherein the computing device associated with the DNS cache comprises one or more of a DNS resolver of the DNS cache, a root server of the DNS cache, a top-level server of the DNS cache, or an authoritative name server of the DNS cache.

12. The method of claim 8, further comprising:
determining, based on the representation and the trained machine learning model, that one or more of the plurality of cache attributes of the representation satisfy one or more of a plurality of alert rules, wherein the one or more of the plurality of alert rules are satisfied when the trained machine learning model provides a level of confidence above a threshold that the one or more of the plurality of cache attributes are associated with the manipulation of the DNS cache.

13. The method of claim 8, wherein causing the remedial action to be performed on the computing device associated with the DNS cache comprises one or more of:
sending, to an administrator of the DNS cache, an alert comprising an indication of the manipulation of in the DNS cache; or
causing the computing device to clear one or more records of the DNS cache.

14. A method comprising:
receiving, at a domain name system (DNS) resolver, a representation of a DNS cache, wherein the representation comprises a plurality of cache attributes associated with the DNS cache;
providing the plurality of cache attributes to a trained machine learning model, wherein the trained machine learning model is configured to detect one or more changes in the plurality of cache attributes indicative of manipulation of the DNS cache, wherein the trained machine learning model is trained on a first subset of a plurality of historical representations associated with one or more historical abnormal change in the DNS cache and a second subset of the plurality of historical representations associated with one or more historical normal change in the DNS cache; and
sending, based on the one or more changes in the plurality of cache attributes being indicative of the manipulation of the DNS cache, an alert to a computing device associated with the DNS cache.

15. The method of claim 14, wherein the representation and the manipulation are associated with a malicious attack on the DNS cache.

16. The method of claim 14, wherein the manipulation comprises one or more of an abnormal change in a byte count of the DNS cache, an abnormal change in a server name associated with a DNS resolution, an abnormal change in a server location associated with a DNS resolution, or an abnormal change in a visual representation of the DNS cache.

17. The method of claim 14, wherein the alert causes the computing device associated with the DNS cache to clear one or more records of the DNS cache.

18. The method of claim 14, further comprising:
receiving, by a DNS resolver, a plurality of alert rules, wherein the plurality of alert rules are configured to detect one or more manipulations of the DNS cache.

19. The method of claim 18, further comprising:
determining, based on the representation, that one or more of the plurality of cache attributes satisfy one or more of the plurality of alert rules, wherein the one or more of the plurality of alert rules are satisfied when the trained machine learning model provides a level of confidence above a threshold that the one or more of the plurality of cache attributes are indicative of the manipulation of the DNS cache.

20. The method of claim 8, wherein at least one representation of the first subset is associated with a malicious attack on the DNS cache.

* * * * *